United States Patent
Corbett et al.

(10) Patent No.: US 8,435,025 B2
(45) Date of Patent: May 7, 2013

(54) HONEYCOMB EXTRUSION DIE APPARATUS (75) Inventors: Daniel Wayne Corbett, Corning, NY (US); Timothy Michael Miller, Elmira, NY (US)

(73) Assignee: Corning Incorporated, Corning, NY (US)

( * ) Notice: Subject to any disclaimer, the term of this patent is extended or adjusted under 35 U.S.C. 154(b) by 679 days.

(21) Appl. No.: 12/548,927

(22) Filed: Aug. 27, 2009

(65) Prior Publication Data
US 2011/0052745 A1 Mar. 3, 2011

(51) Int. Cl.
B29C 47/20 (2006.01)

(52) U.S. Cl.
USPC .......................... 425/380; 425/461; 425/467

(58) Field of Classification Search .............. 425/192 R, 425/380, 461, 467; 264/177.12
See application file for complete search history.

(56) References Cited

U.S. PATENT DOCUMENTS

| | | | |
|---|---|---|---|
| 4,349,329 A | 9/1982 | Naito et al. | |
| 4,362,495 A | 12/1982 | Naito et al. | |
| 4,381,912 A * | 5/1983 | Yamamoto et al. | 425/461 |
| 5,761,787 A | 6/1998 | Kragle et al. | |
| 5,807,590 A | 9/1998 | Ishikawa et al. | |
| 6,060,148 A | 5/2000 | Matsubara et al. | |
| 6,080,348 A | 6/2000 | Shalkey | |
| 6,287,103 B1 | 9/2001 | Miyazaki | |
| 6,299,813 B1 | 10/2001 | Brew et al. | |
| 7,163,389 B2 | 1/2007 | Miyazaki et al. | |

* cited by examiner

*Primary Examiner* — Yogendra Gupta
*Assistant Examiner* — Joseph Leyson
(74) *Attorney, Agent, or Firm* — Matthew J. Mason

(57) ABSTRACT

Honeycomb extrusion die apparatus include a die body including a first set of die pins circumscribed by a second set of die pins. At least a portion of the end face of die pins of the second set of die pins are positioned along a peripheral surface extending at an oblique angle with respect to the extrusion direction. A lateral width of the open end of a plurality of discharge slots defined by the second set of die pins is larger than a lateral width of the open end of a plurality of discharge slots defined by the first set of die pins. Methods of making a honeycomb extrusion die apparatus are also provided.

9 Claims, 5 Drawing Sheets

HONEYCOMB EXTRUSION DIE APPARATUS

FIELD

The present disclosure relates generally to honeycomb extrusion die apparatus, and more particularly, to honeycomb extrusion die bodies and methods of making honeycomb extrusion die bodies including discharge slots having open ends with different slot widths.

BACKGROUND

Conventional methods for modifying die bodies for extrusion of honeycomb bodies include plunge electrical discharge machining of the die body with a tool electrode having a matrix of web portions corresponding to an intersecting array of discharge slots extending into the die body. Such conventional methods are known to provide a conventional honeycomb extrusion die apparatus configured to produce a honeycomb body with cell walls that increase in width with increasing proximity to the outer periphery of the honeycomb body.

SUMMARY

In one aspect, a honeycomb extrusion die apparatus is disclosed herein including a die body with an inlet end and a discharge end opposite the inlet end in an extrusion direction. The honeycomb extrusion die apparatus further includes an inlet region beginning at the inlet end and defining a plurality of feedholes extending from the inlet end. The honeycomb extrusion die apparatus further includes a discharge region terminating at the discharge end. The discharge region includes a plurality of die pins with each die pin including an end face positioned along a discharge face of the die body. The die pins further include side walls defining an intersecting array of discharge slots extending into the die body from the discharge face. Each discharge slot includes an open end and an expanded area defined between corresponding side walls of adjacent die pins. The discharge slots connect with the feed holes at feed hole and discharge slot intersections at an interface within the die body between the inlet region and the discharge region. The plurality of die pins include a first set of die pins circumscribed by a second set of die pins. At least a portion of the end face of die pins of the second set of die pins are positioned along a peripheral surface extending at an oblique angle with respect to the extrusion direction. A lateral width of the open end of a plurality of discharge slots defined by the second set of die pins is larger than a lateral width of the open end of a plurality of discharge slots defined by the first set of die pins.

In another aspect, a method of making a honeycomb extrusion die apparatus is disclosed herein comprising the step of providing a die body with a plurality of die pins including side walls defining an intersecting array of discharge slots extending into the die body, each of the discharge slots including an expanded area and an open end, the plurality of die pins including a first set of die pins circumscribed by a second set of die pins, the method including the step of subsequently removing at least part of an end portion of multiple die pins of the plurality of die pins. Upon removal a lateral width of the open end of a plurality of discharge slots defined by the second set of die pins is larger than a lateral width of the open end of a plurality of discharge slots defined by the first set of die pins.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Figure 1:
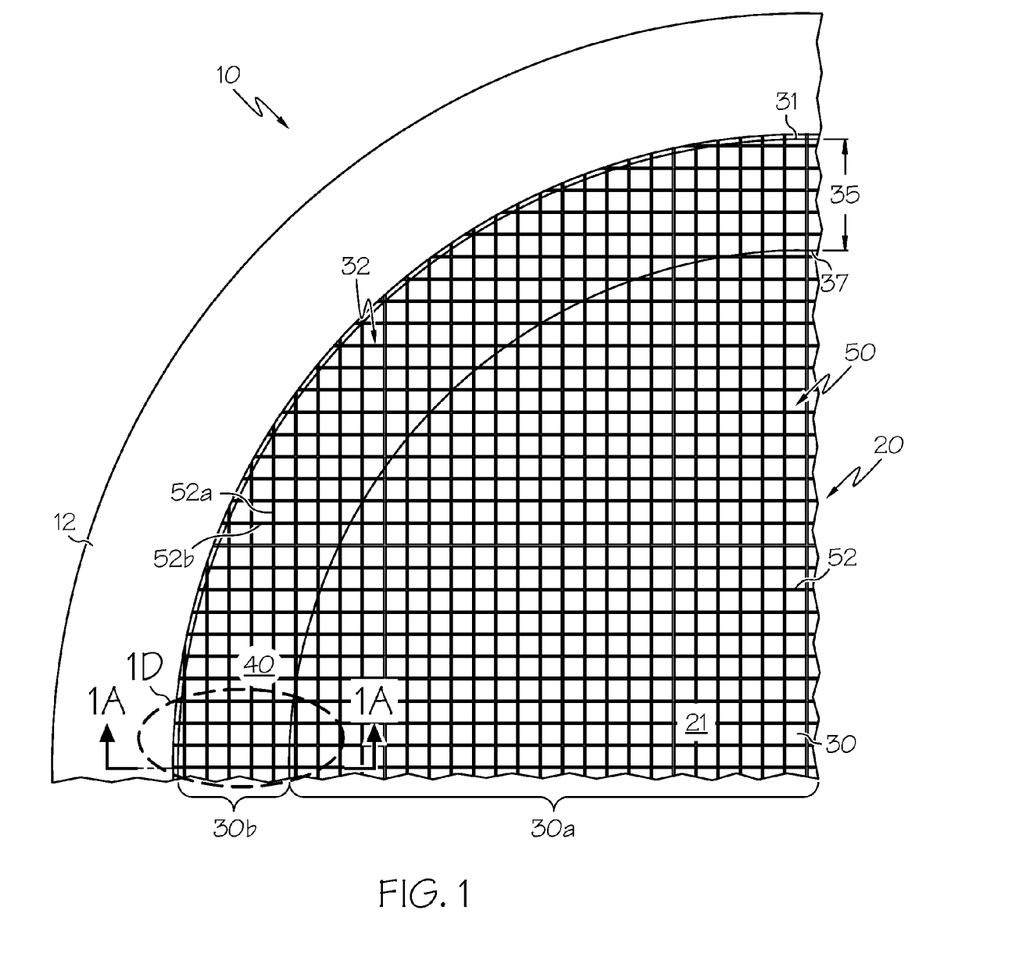
FIG. 1 is partial plan view of an example honeycomb extrusion die apparatus.
Figure 1A:
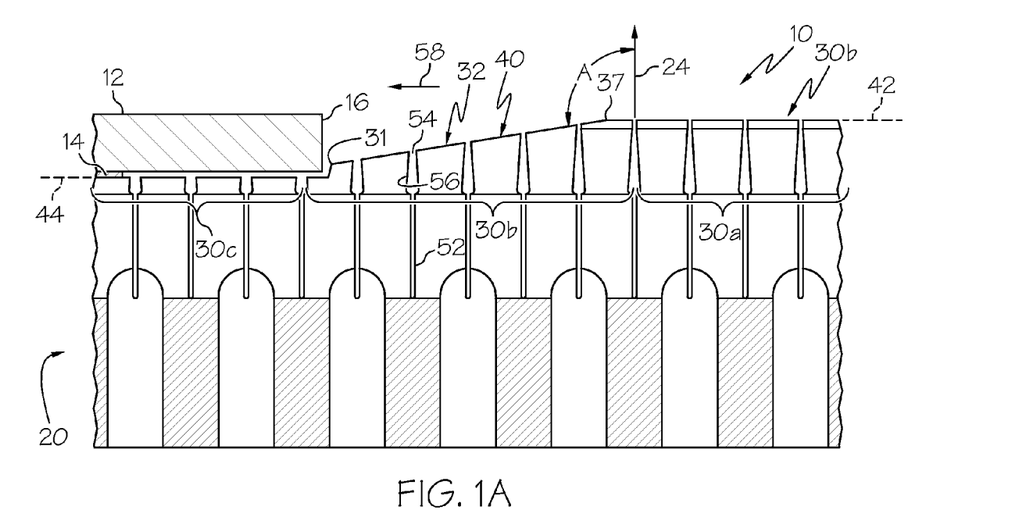
FIG. 1A is a partial sectional view of an example honeycomb extrusion die apparatus along line 1A-1A of FIG. 1.

Example honeycomb extrusion die apparatus 10 can comprise a die body 20 configured to be installed as part of an extrusion device (not shown). As shown in FIGS. 1 and 1A, the honeycomb extrusion die apparatus 10 can also comprise a mask member 12, a shim 14 and/or other components in addition to the die body 20. The honeycomb extrusion die apparatus 10 is configured to facilitate extrusion of plasticized ceramic-forming batch material to form a honeycomb body. For instance, honeycomb bodies can be used as a particulate filter for processing exhaust from a combustion engine. In some examples, the honeycomb bodies may be loaded with a catalyst to reduce nitrogen oxide compounds or other environmental pollutants.

FIG. 1 is a schematic illustration of the second quadrant of an example honeycomb extrusion die apparatus 10. Although not shown, the first quadrant can be a mirror image of the second quadrant about a vertical axis. Moreover, the third and fourth quadrants can be a mirror image of the first and second quadrants, respectively, about a horizontal axis. Thus, FIG. 1 can represent an example honeycomb extrusion die apparatus 10 that has a circular discharge face 21 configured to extrude cylindrical honeycomb bodies having a circular cylindrical form. The discharge face of the honeycomb extrusion die apparatus can have different shapes in other embodiments. For instance, the discharge face can have a polygonal shape with three or more sides [e.g., triangular, rectangular (e.g., square), etc.] or other geometric shapes such as elliptical or the like. The shape of the discharge face can be selected depending on the desired shape of the cylindrical honeycomb bodies extruded with the die body.

Figure 1B:
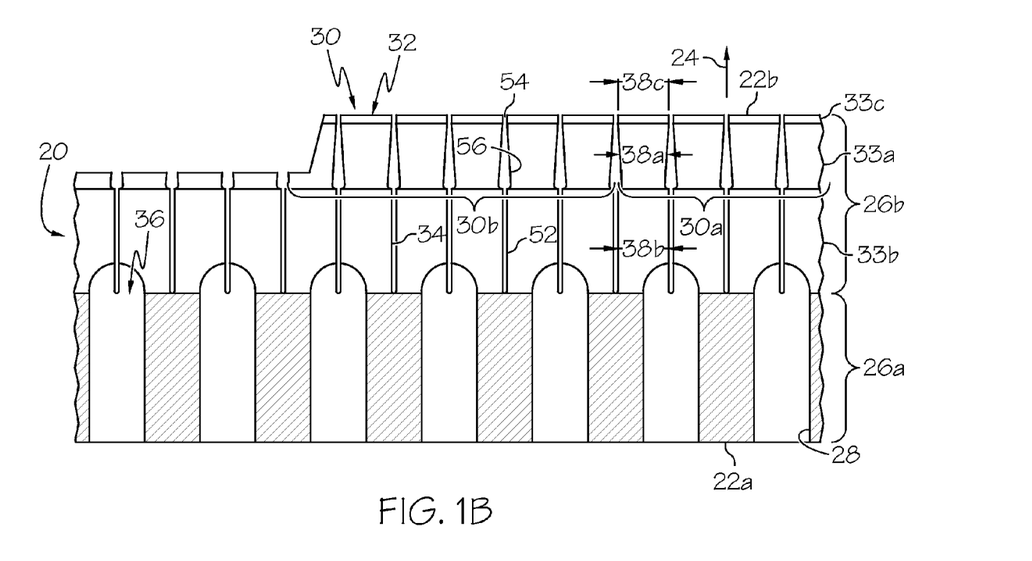
FIG. 1B is a partial sectional view of the honeycomb extrusion die apparatus similar to FIG. 1A prior to removing end portions of multiple die pins.

Referring to FIG. 1B, the die body 20 includes an inlet end 22a and a discharge end 22b opposite the inlet end 22a in an extrusion direction 24. The die body 20 includes an inlet region 26a, beginning at the inlet end 22a, that defines a plurality of feedholes 28 extending from the inlet end 22a. The plurality of feedholes 28 are configured to receive batch material from an extrusion device (not shown) such a ram extruder or screw extruder.

The die body 20 further includes a discharge region 26b terminating at the discharge end 22b. The discharge region 26b includes a plurality of die pins 30. Each die pin 30 includes an end face 32 positioned along a discharge face 21 (see FIG. 1) of the die body 20. The plurality of die pins 30 include a first set of die pins 30a circumscribed by a second set of die pins 30b. As shown in FIG. 1, the first set of die pins 30a can be formed as an inner circular zone of die pins 30 while the second set of die pins 30b can comprise an outer annular zone of die pins 30. It will be appreciated that the first and second zone can comprise various noncircular shapes depending on the desired shape of the cylindrical honeycomb bodies extruded with the die body.

As shown in FIGS. 1 and 1A, at least a portion of the end face 32 of the die pins 30 of the second set of die pins 30b can be positioned along a peripheral surface 40. The peripheral surface can have a wide range of shapes and sizes depending on the particular application. For instance, as shown in FIG. 1A, the peripheral surface 40 can comprise a conical surface with a substantially linear cross sectional profile although the conical surface can have arc-shaped cross sectional profile in other embodiments. It will be appreciated that the cross sectional profile can comprise shapes defined by a function such as a parabolic function, sinusoidal function or the illustrated linear function. Moreover, the function can remain consistent or change as it is rotated about the axis of the die body 20 to form the peripheral surface 40. As shown, the function can comprise a linear function that remains constant as it is rotated about the axis of the die body 20.

As further illustrated in FIGS. 1 and 1A, the end face 32 of at least some of the die pins 30 of the first set of die pins 30a can be positioned along a first plane 42 that is substantially perpendicular to the extrusion direction 24. In the illustrated example, at least a portion of the end faces 32 of all of the die pins of the first set of die pins 30 are positioned along the first plane 42. In other embodiments, at least a portion of the end faces 32 of die pins of the first set of die pins 30 can be positioned along a nonplanar surface. For instance, the end faces 32 of the die pins 30 of the first set of die pins 30a can extend along a concave surface, a convex surface or other surface. In such examples, an abrupt transition 37 can be provided between the first set of die pins 30a and the second set of die pins 30b although a gradual transition can be provided in other embodiments. For instance, the transition can comprise a rounded region to provide a seamless transition between the first and second set of die pins.

The peripheral surface 40 can also have an outer radius, and/or a radial width that varies or remains constant about the first set of die pins 30a. For example, as shown in FIG. 1, the peripheral surface 40 can have a substantially constant radial width 35 about the first set of die pins 30a. The substantially constant radial width 35 can provide a circular transition 37 that is concentric with the outer periphery 31. As shown in FIG. 1, the radial width 35 can comprise, for example, about five die pins 30. A radial width of more or less than five die pins can be provided in other examples. In some embodiments, the radial width 35 can be less than one die pin 30.

As shown in FIG. 1A, the plurality of pins 30 can still further include a third set of die pins 30c. The third set of die pins 30c can circumscribe the second set of die pins 30b with the end face 32 of at least some of the die pins of the third set of die pins 30c positioned along a second plane 44. For example, as illustrated, the end face of all of the die pins of the third set of die pins 30c can be positioned along the second plane 44. As shown, the second plane 44 can be substantially perpendicular to the extrusion direction 24 and can be spaced away from the first plane 42. In the illustrated embodiment, the first and second planes 42, 44 are parallel and spaced apart from one another and are each substantially perpendicular to the extrusion direction 24.

Each die pin 30 also includes side walls 34 defining an intersecting array 50 (See FIG. 1) of discharge slots 52 extending into the die body 20 from the discharge face 21. The discharge slots 52 can connect with the feed holes 28 at feed hole and discharge slot intersections 36 at an interface within the die body 20 between the inlet region 26a and the discharge region 26b.

As shown in FIG. 1B, each discharge slot 52 includes an open end 54 and an expanded area 56 defined between corresponding side walls 34 of adjacent die pins 30. The expanded area 56 can comprise a wide variety of shapes and sizes. The expanded area 56 is expanded with respect to a root segment 33b that is disposed downstream of the discharge slot intersections 36 (i.e., in the extrusion direction 24). In one example, the expanded area can be flared (e.g., inwardly and/or outwardly) in the extrusion direction 24. FIGS. 1A and 1B illustrate an example of an expanded area 56 that is flared inwardly in the extrusion direction 24.

Each die pin 30 can include a longitudinal section 33a at least partially defining the expanded area 56 of at least one of the plurality of discharge slots 52. The expanded area 56 can be predetermined based on a shape of the die pins defining the discharge slots 52. As shown, the longitudinal section 33a of each die pin 30 can include a transverse width 38a that is reduced when compared to the transverse width of another portion of the die pin 30. For instance, the transverse width 38a of the longitudinal section 33a can be reduced when compared to the transverse width 38b of a root segment 33b of the die pin 30. In addition or alternatively, the transverse width 38a of the longitudinal section 33a can be reduced when compared to the transverse width 38c of an end segment 33c of the die pin 30. In such examples, the longitudinal section 33a of each die pin 30 can include a recess in a surface of at least one side wall of the respective die pin. In the illustrated example, a recess is provided in each of the four side walls 34 of each die pin 30 although different slot configurations can be provided with a recess in less than all of the side walls of the die pin in other embodiments.

Embodiments with an end segment 33c can position the expanded area 56 of a plurality of the discharge slots 52 defined by the first set of die pins at a location that is spaced away from the respective open end 54 of the corresponding discharge slot 52. In such embodiments, the expanded area 56 can provide a modified flow of the batch material as it is being extruded through the die body.

The transverse width 38c of the end segment 33c can be identical to the transverse width 38b of the root segment 33b although relatively larger or smaller transverse widths can be provided in other examples. Moreover, example die pins may be provided without a root segment 33b and/or without an end segment 33c. In such a configuration, the transverse width of the die pin may be reduced along substantially the entire length of the die pin 30. For instance, the die pin may be tapered inwardly or outwardly in the extrusion direction 24 along substantially the entire length of the die pin 30.

As shown in FIG. 1A, the open end 54 of at least some of the discharge slots 52 defined by the second set of die pins 30b intersect the expanded area 56 of the corresponding discharge slot 52. Moreover, the open end 54 of selected discharge slots can each be configured to intersect a selected location of the expanded area 56 to provide the open end 54 with a predetermined lateral width. As shown in FIG. 1A, the lateral width of the open end 54 of a plurality of discharge slots 52 defined by the second set of die pins 30b is larger than a lateral width of the open end 54 of a plurality of discharge slots 52 defined by the first set of die pins 30a. As shown, the plurality of discharge slots 52 of the first set of die pins 30a can have open ends 54 with substantially identical lateral widths although the open ends 54 may have different lateral widths in other embodiments. Moreover, the illustrated plurality of discharge slots 52 defined by the second set of die pins 30b include an open end 54 with a lateral width that increases in a radial direction 58 towards an outer periphery 31 of the second set of die pins 30b. As shown, the increase in lateral width can be provided by successively shorter pins and successively deeper intersections with the inwardly flared expanded area 56 of the discharge slot 52. As shown in FIG. 1A, the increased lateral width in the radial direction 58 can be provided along each of the vertical slots 52a (as oriented in FIG. 1A). Likewise, as shown in FIG. 1D, the increased lateral width in the radial direction 58 can also be provided along each of the horizontal slots 52b. As shown, successively deeper intersections can be established by providing the peripheral surface 40 at an obtuse angle A with respect to the extrusion direction 24. Various obtuse angles A may be provided such as from about 95° to about 175°, or such as from about 95° to about 120°. Thus, as shown, providing the discharge slots 52 of a second set of die pins 30b with an expanded area that is flared inwardly in the extrusion direction 24 together with a peripheral surface 40 at an obtuse angle A with respect to the extrusion direction 24 can provide the corresponding discharge slots with open ends that increase in the radial direction 58.

Figure 1C:
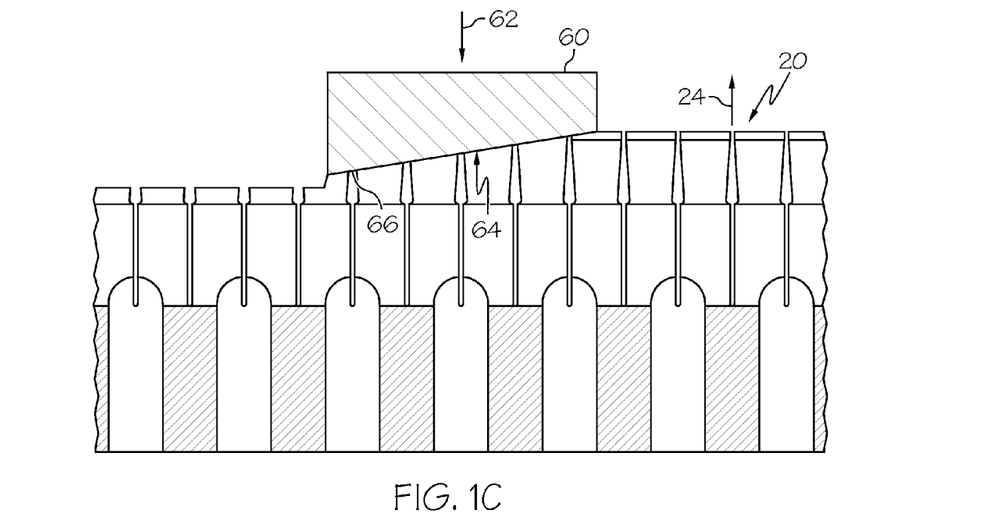
FIG. 1C schematically illustrates removal of end portions of multiple die pins of the honeycomb extrusion die apparatus of FIG. 1B to achieve the honeycomb extrusion die apparatus of FIG. 1A.
Figure 1D:
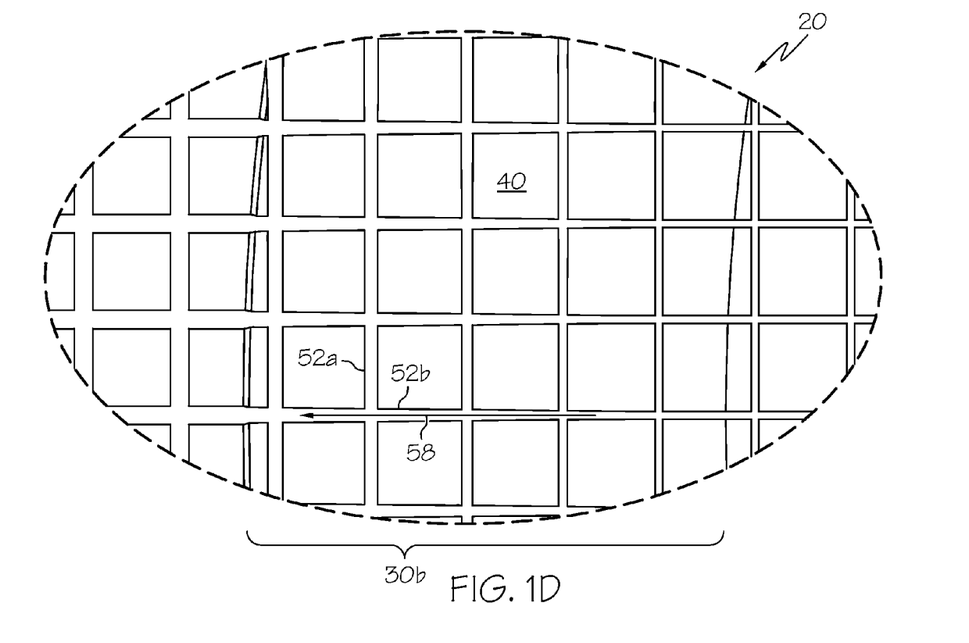
FIG. 1D is an enlarge view of a portion of the example honeycomb extrusion die apparatus as indicated in FIG. 1.

FIG. 1C demonstrates the method of modifying the die body 20 of FIG. 1B to obtain the die body 20 of FIG. 1A. As shown in FIG. 1B, the first set of die pins 30a and second set of die pins 30b initially have substantially the same height wherein the open ends 54 of the discharges slots all have the same lateral width. At least part of an end portion of multiple die pins of the second set of die pins 30b can be removed such that the lateral width of the open end 54 of a plurality of discharge slots 52 defined by the second set of die pins is larger than a lateral width of the open end 54 of a plurality of discharge slots 52 defined by the first set of die pins. The end portion of the multiple die pins can be removed in a wide variety of ways. For example, as schematically shown in FIG. 1C, plunge electric discharge machining (EDM) can be used to remove the end portion of the plurality of die pins. As shown, an electrode 60 can be plunged in direction 62 to remove the end portions of die pins of the second set of die pins 30b. Other methods such as mechanical (e.g., turning, grinding, cutting, etc.), fluid, chemical, electrical or other removal techniques can be used to remove the end portions of the die pins. The example electrode 60 can comprise a ring with a conical lower surface 64 having a linear shaped cross sectional profile 66 designed to machine away end portions of the die pins to form the conical peripheral surface 40 with the illustrated linear shaped cross sectional profile. The electrode 60 can be modified to provide peripheral surfaces including the desired shape.

Figure 2A:
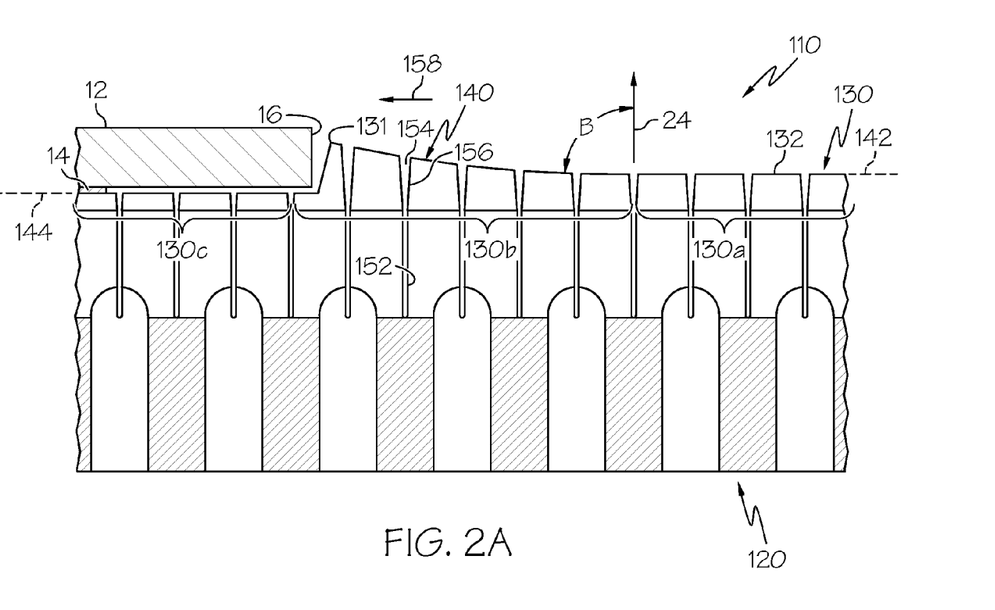
FIG. 2A is a partial sectional view of another example honeycomb extrusion die apparatus along line 1A-1A of FIG. 1.
Figure 2B:
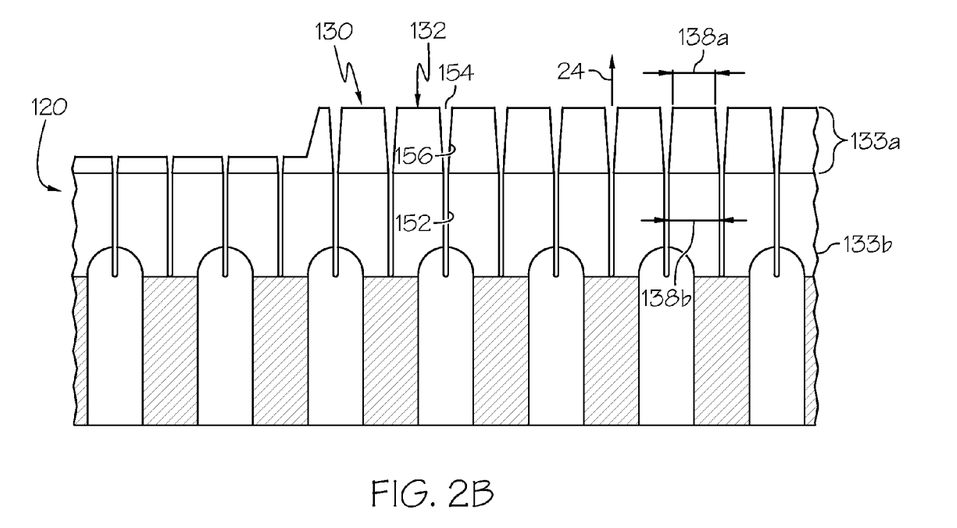
FIG. 2B is a partial sectional view of the honeycomb extrusion die apparatus similar to FIG. 2A prior to removing end portions of multiple die pins.

Another example honeycomb extrusion die apparatus 110 is illustrated in FIG. 2A. The honeycomb extrusion die apparatus 110 can comprise a die body 120 configured to be installed as part of an extrusion device (not shown). As shown, the honeycomb extrusion die apparatus 110 can also comprise a mask member 12, a shim 14 and/or other components in addition to the die body 120. As shown in FIG. 2B, aspects of the die body 120 can be similar or identical to the die body 20 discussed with respect to FIGS. 1, 1A and 1B above.

As shown in FIG. 2A, the plurality of die pins 130 include a first set of die pins 130a circumscribed by a second set of die pins 130b. At least a portion of the end face 132 of the die pins 130 of the second set of die pins 130b can be positioned along a peripheral surface 140. The peripheral surface can have a wide range of shapes and sizes depending on the particular application. For instance, as shown in FIG. 2A, the peripheral surface 140 can comprise a conical surface with a substantially arc-shaped cross sectional profile although a linear profile may be used in other embodiments. It will be appreciated that the cross sectional profile can comprise shapes defined by a function such as a parabolic function, sinusoidal function or a linear function similar to that illustrated. Moreover, the function can remain constant or change as it is rotated about the axis of the die body 120 to form the peripheral surface 140. As shown, the function can comprise a non-linear function that remains that can be rotated about the axis of the die body 120 such that the conical peripheral surface 140 comprises a concave conical peripheral surface.

As further illustrated in FIG. 2A, the end face 132 of at least some of the die pins 130 of the first set of die pins 130a can be positioned along a first plane 142 that is substantially perpendicular to the extrusion direction 24. In the illustrated example, at least a portion of the end faces 132 of all of the die pins of the first set of die pins 130 are positioned along the first plane 142. In other embodiments, at least a portion of the end faces 132 of die pins of the first set of die pins 130 can be positioned along a nonplanar surface. For instance, the end faces 132 of the die pins 130 of the first set of die pins 130a can extend along a concave surface, a convex surface or other surface. In such examples, an abrupt transition can be provided between the first set of die pins 130a and the second set of die pins 130b although a gradual transition can be provided in other embodiments. For instance, the transition can comprise a rounded region to provide a seamless transition between the first and second set of die pins.

The peripheral surface 140 can also have an outer radius, and/or, a radial width that varies or remains constant about the first set of die pins 130a. For example, as shown, the peripheral surface 140 can have a substantially constant radial width about the first set of die pins 130a. As shown in the embodiment of FIG. 2A, the radial width can comprise about five die pins 130. A radial width of more or less than five die pins can be provided in other embodiments. In some embodiments, the radial width can be less than one die pin 130.

As shown in FIG. 2A, the plurality of pins 130 can still further include a third set of die pins 130c. The third set of die pins 130c can circumscribe the second set of die pins 130b with the end face 32 of at least some of the die pins of the third set of die pins 130c positioned along a second plane 144. For example, as illustrated, the end face of all of the die pins of the third set of die pins 130c can be positioned along the second plane 144. As shown, the second plane 144 can be substantially perpendicular to the extrusion direction 24 and can be spaced away from the first plane 142. In the illustrated embodiment, the first and second planes 142, 144 are parallel and spaced apart from one another and are each substantially perpendicular to the extrusion direction 24.

Each die pin 130 can include a longitudinal section 133a at least partially defining the expanded area 156 of at least one of the plurality of discharge slots 152. The expanded area 156 is flared outwardly in the extrusion direction 24. The expanded area 156 can be predetermined based on a shape of the die pins defining the discharge slots 152. As shown, the longitudinal section 133a of each die pin 130 can include a transverse width 138a that is reduced when compared to the transverse width of another portion of the die pin 130. For instance, the transverse width 138a of the longitudinal section 133a can be reduced when compared to a transverse width 138b of a root segment 133b of the die pin 130. Moreover, example die pins may be provided without a root segment 133b. In such a configuration, the transverse width of the die pin may be reduced along substantially the entire length of the die pin 130.

As shown in FIG. 2A, the open end 154 of at least some of the discharge slots 152 defined by the second set of die pins 130b intersect the expanded area 156 of the corresponding discharge slot 152. Moreover, the open end 154 of selected discharge slots can each be configured to intersect a selected location of the expanded area 156 to provide the open end 154 with a predetermined lateral width. As shown in FIG. 2A, the lateral width of the open end 154 of a plurality of discharge slots 152 defined by the second set of die pins 130b is larger than a lateral width of the open end 154 of a plurality of discharge slots 152 defined by the first set of die pins 130a. As shown, the plurality of discharge slots 152 of the first set of die pins 130a can have open ends 154 with substantially identical lateral widths although the open ends 154 may have different lateral widths in other embodiments. Moreover, the illustrated plurality of discharge slots 152 defined by the second set of die pins 130b include an open end 154 with a lateral width that increases in a radial direction 158 towards an outer periphery 131 of the second set of die pins 130b. As shown, the increase in lateral width can be provided by successively shallower intersections with the outwardly flared expanded area 156 of the discharge slot 152. The increased lateral width in the radial direction 158 can be provided along both vertical and horizontal slots of the intersecting array of discharge slots. As shown, successively shallower intersections can be established by providing the peripheral surface 140 at an acute angle B with respect to the extrusion direction 24. Various acute angles B may be provided such as from about 5° to about 85°, or such as from about 45° to about 85°. Thus, as shown, providing the discharge slots 152 of a second set of die pins 130b with an expanded area that is flared outwardly in the extrusion direction 24 together with a peripheral surface 140 at an acute angle B with respect to the extrusion direction 24 can provide the corresponding discharge slots with open ends that increase in the radial direction. As shown, the acute angle B is measured from a point tangent to the cross-sectional profile curve of the peripheral surface. Thus, the acute angle B can increase in size in the radial direction 158.

Figure 2C:
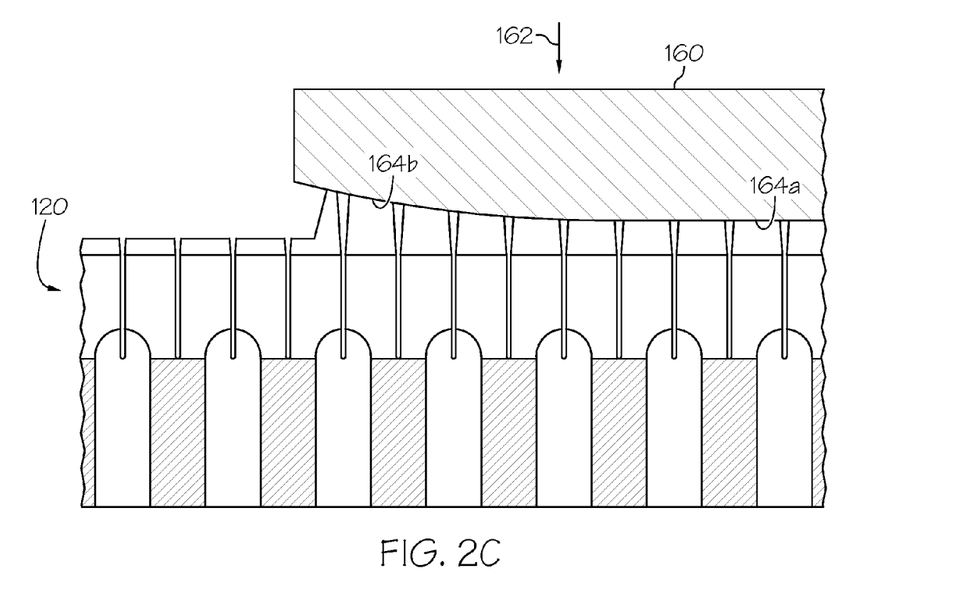
FIG. 2C schematically illustrates removal of end portions of multiple die pins of the honeycomb extrusion die apparatus of FIG. 2B to achieve the honeycomb extrusion die apparatus of FIG. 2A.

FIG. 2C demonstrates the method of modifying the die body 120 of FIG. 2B to obtain the die body 120 of FIG. 2A. As shown in FIG. 2B, the first set of die pins 130a and second set of die pins 130b initially have substantially the same height wherein the open ends 154 of the discharges slots 152 all have the same lateral width. At least part of an end portion of multiple die pins of the first and second set of die pins 130a, 130b can be removed such that the lateral width of the open end 154 of a plurality of discharge slots 152 defined by the second set of die pins 130b is larger than a lateral width of the open end 154 of a plurality of discharge slots 152 defined by the first set of die pins 130a. The end portion of the multiple die pins can be removed in a wide variety of ways. For example, as schematically shown in FIG. 2C, plunge electric discharge machining (EDM) can be used to remove the end portion of the plurality of die pins. As shown, an electrode 160 can be plunged in direction 162 to remove the end portions of die pins of the first and second set of die pins 130a, 130b. Other methods such as mechanical (e.g., turning, grinding, cutting, etc.), fluid, chemical, electrical or other removal techniques can be used to remove the end portions of the die pins. The example electrode 160 can include comprise a plate with a flat lower surface portion 164a and a convex lower peripheral surface portion 164b circumscribing the flat lower surface portion 164a. The electrode 160 is designed to machine away end portions of the die pins to form the concave conical peripheral surface 140 of the second set of die pins 130b and the planar arrangement of the end faces 132 of the die pins of the first set of die pins 130a. The electrode 160 can be modified to provide peripheral surfaces including the desired shape.

As shown in FIGS. 1A and 2A, the honeycomb extrusion die apparatus 10, 110 can further include a mask member 12 positioned with respect to the third set of die pins 30c, 130c, wherein the mask member 12 includes an opening 16 aligned with the first and second set of die pins in the extrusion direction 24.

During production of the ceramic honeycomb body, raw materials such as inorganic materials, a liquid vehicle and a binder are mixed into a batch. For instance the batch can comprise various cement mixtures including a paste and/or slurry, such as particles and/or powders mixed with polymer binders and/or low molecular weight liquids and combinations of these and other materials, such as for forming a cement paste. Descriptions of example materials that may be used for the cement mixture can be found in numerous patents and patent applications. Example ceramic batch material compositions including cordierite are disclosed in U.S. Pat. Nos. 3,885,977; RE 38,888; 6,368,992; 6,319,870; 6,210,626; 5,183,608; 5,258,150; 6,432,856; 6,773,657; 6,864,198; and U.S. Patent Application Publication Nos. 2004/0029707, 2004/0261384, and 2005/0046063. Examples ceramic batch material compositions for forming aluminum titanate are those disclosed in U.S. Pat. Nos. 4,483,944; 4,855,265; 5,290,739; 6,620,751; 6,942,713; 6,849,181; U.S. Patent Application Publication Nos.: 2004/0020846; 2004/0092381; and in PCT Application Publication Nos. WO 2006/015240; WO 2005/046840; and WO 2004/011386.

The prepared batch can then be extruded in the extrusion direction 24 by way of the honeycomb extrusion die apparatus 10, 110 into a green honeycomb body. As the lateral width of the open ends of the discharge slots are larger in the radial direction, the extrusion process can produce a honeycomb body with cell walls that increase in width with increasing proximity to the outer periphery of the honeycomb body. In one example, the wall thicknesses of several cells can increase in the radial direction, thereby enhancing the strength of peripheral portions of the honeycomb body. In other embodiments, the thickness of only a portion of the cell wall attached to the skin of the honeycomb body may be increased, thereby enhancing the strength of the connection of the skin of the honeycomb body to the remaining honeycomb network.

The green body can then be heated to be dried and further heated and processed into a fired honeycomb body. The fired honeycomb body can comprise various refractory materials depending on the particular application. For example, the fired honeycomb bodies may comprise a ceramic material such as cordierite, mullite, silicon carbide, aluminum titanate or other materials or combinations thereof.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A honeycomb extrusion die apparatus including a die body, the die body comprising:
an inlet end;
a discharge end opposite the inlet end in an extrusion direction;
an inlet region beginning at the inlet end and defining a plurality of feedholes extending from the inlet end; and
a discharge region terminating at the discharge end, the discharge region including a plurality of die pins with each die pin including an end face positioned along a discharge face of the die body, the die pins including side walls defining an intersecting array of discharge slots extending into the die body from the discharge face, each discharge slot including an open end and an expanded area defined between corresponding side walls of adjacent die pins, wherein the expanded area is flared inwardly in the extrusion direction and wherein the discharge slots connect with the feed holes at feed hole and discharge slot intersections at an interface within the die body between the inlet region and the discharge region, wherein the die pins include a longitudinal section and a root segment, the longitudinal section at least partially defining the expanded area and the root segment disposed between the longitudinal section and the feed hole and discharge slot intersections, wherein the longitudinal section includes a transverse width that is less than a transverse width of the root segment; and
wherein the plurality of die pins include a first set of die pins circumscribed by a second set of die pins, at least a portion of the end face of die pins of the second set of die pins are positioned along a peripheral surface extending at an oblique angle with respect to the extrusion direction, and a lateral width of the open end of a plurality of discharge slots defined by the second set of die pins is larger than a lateral width of the open end of a plurality of discharge slots defined by the First set of die pins; and
wherein the open end of at least some of the discharge slots defined by the second set of die pins intersect the expanded area of the corresponding discharge slot.

2. The honeycomb extrusion die apparatus of claim 1, wherein the oblique angle is an obtuse angle.

3. The honeycomb extrusion die apparatus of claim 1, wherein the end face of at least some of the die pins of the first set of die pins are positioned along a first plane that is substantially perpendicular to the extrusion direction.

4. The honeycomb extrusion die apparatus of claim 3, wherein the plurality of pins include a third set of die pins circumscribing the second set of die pins and the end face of at least some of the die pins of the third set of die pins are positioned along a second plane that is substantially perpendicular to the extrusion direction, wherein the first plane is spaced away from the second plane.

5. The honeycomb extrusion die apparatus of claim 4, further comprising a mask member positioned with respect to the third set of die pins, wherein the mask member includes an opening aligned with the first and second set of die pins in the extrusion direction.

6. The honeycomb extrusion die apparatus of claim 1, wherein the longitudinal section of each die pin includes a recess in a surface of at least one side wall of the respective die pin.

7. The honeycomb extrusion die apparatus of claim 1, wherein the expanded area of a plurality of the discharge slots defined by the first set of die pins are each spaced away from the respective open end of the corresponding discharge slot.

8. The honeycomb extrusion die apparatus of claim 1, wherein the peripheral surface comprises a conical surface.

9. The honeycomb extrusion die apparatus of claim 1, wherein the lateral width of the open end of the plurality of discharge slots defined by the second set of die pins increases in a radial direction towards an outer periphery of the second set of die pins.

* * * * *